United States Patent [19]
Byrne

[11] Patent Number: 5,490,156
[45] Date of Patent: Feb. 6, 1996

[54] CROSS-COUPLED PARITY CIRCUIT WITH CHARGING CIRCUITRY TO IMPROVE RESPONSE TIME

[75] Inventor: Jeffrey S. Byrne, Garland, Tex.

[73] Assignee: Cyrix Corporation, Richardson, Tex.

[21] Appl. No.: 493,018

[22] Filed: Jun. 21, 1995

Related U.S. Application Data

[63] Continuation of Ser. No. 27,032, Mar. 5, 1993, abandoned.

[51] Int. Cl.⁶ .......................... G06F 11/10; H03M 13/00
[52] U.S. Cl. ........................................ 371/49.2; 371/49.1
[58] Field of Search .................. 371/49.1, 49.2, 371/49.3; 307/448, 455, 279, 468; 364/265, 266.3

[56] References Cited

U.S. PATENT DOCUMENTS

| | | | |
|---|---|---|---|
| 4,451,922 | 5/1984 | Dearden et al. | 371/49 |
| 4,695,744 | 9/1987 | Giordano | 307/279 |
| 4,816,706 | 3/1989 | Dhong et al. | 307/530 |
| 5,023,480 | 6/1991 | Gieseke et al. | 307/448 |

OTHER PUBLICATIONS

"Principles of CMOS VLSI Design—A Systems Perspective", by Neil Weste and Kamran Eshraghian, Reprinted with Corrections Oct., 1985, pp. 332–334.

*Primary Examiner*—Robert W. Beausoliel, Jr.
*Assistant Examiner*—T. Tu
*Attorney, Agent, or Firm*—Andrew S. Viger; John L. Maxin

[57] ABSTRACT

A parity circuit generates an output parity bit responsive to a plurality of data input bits. The parity circuit comprises a plurality of transistor stages coupled to the input bits and the output bit, the value of the input bits defining at least one charging path through the transistor stages. The charging path is coupled at first and second nodes to a power supply, such that the charging path is supplied with current at both ends, thereby increasing the responsiveness of the parity circuit.

5 Claims, 3 Drawing Sheets

CROSS-COUPLED PARITY CIRCUIT WITH CHARGING CIRCUITRY TO IMPROVE RESPONSE TIME

The present application is a file wrapper continuation of application Ser. No. 08/027,032 filed, Mar. 5, 1993, now abandoned.

TECHNICAL FIELD OF THE INVENTION

The invention relates generally to digital circuits, and more particularly to a cross-coupled parity circuit in which a charging circuitry is connected to each leg of the parity circuit in order to improve overall response time.

BACKGROUND OF THE INVENTION

Complex integrated circuit designs such as microprocessors commonly use parity circuits as a means for error-checking various data manipulation and transfer operations. For example, parity circuits are used to check the results of logical operations (AND, OR, XOR), addition and shift operations, and transfers over internal or external data buses.

One common design for a parity circuit uses cross-coupled field effect transistors as shown in FIG. 1. In this design, two chains of transistors form a pair of legs arranged in parallel between a power source and a ground. Each transistor in one leg is cross-coupled to a corresponding transistor in the other leg by means of two cross-coupling transistors. Non-inverted data bits are applied to the gates of the leg transistors, while inverted data bits are applied to the gates of the cross-coupling transistors. The inputs act to enable two separate D.C. pathways within the parity circuit, the exact configuration of the pathways being a function of the states of the particular data bits so applied. One of the D.C. pathways will always extend from ground up to one of the parity output nodes, while the other D.C. pathway (the "charging path") will always extend from Vcc down through the other parity output node and ultimately to a floating termination near the end of one of the circuit legs.

In operation, newly-generated parity outputs become valid and stable only after ground voltage has propagated all the way up through the first pathway and after Vcc has propagated all the way down through the second pathway. Thus, response time depends on how quickly the power source can deliver sufficient current into the parity circuit in order to bring the output nodes to their steady-state voltage levels.

It is a specific object of the present invention to provide a cross-coupled parity circuit having better response time than conventional cross-coupled parity circuits, while not requiring a significant increase in layout area.

SUMMARY OF THE INVENTION

The invention is a cross-coupled parity circuit for checking the parity of an n-bit input data value and generating a corresponding parity output.

In one aspect of the invention, the parity circuit comprises first and second circuit legs, said first and second circuit legs being arranged in parallel between a power source and a ground. Each of said circuit legs comprises a series of cross-coupled transistor pair stages, and each of said stages defines an input for one bit of an input data value.

A charging circuitry is coupled to one end of both circuit legs in order to provide an additional path through which current may flow while Vcc propagates through the charging path. Whatever the charging path configuration that a particular input data value may yield, said charging circuitry operates to couple one end of the charging path to Vcc. Thus, in the circuit of the invention, both ends of the charging path will be connected to the power source in every case, whereas only one end of the charging path would have been so connected under the prior art design. The addition of the charging circuitry thereby reduces the effective resistance of the charging path resulting in faster overall response time.

In an exemplary embodiment, an eight-bit parity circuit is formed with cross-coupled n-channel field effect transistors. The charging circuitry is formed with p-channel transistors coupled to respective legs of the parity circuit opposite the Vcc power source. Depending on the input data value, one or the other of said p-channel transistors in the charging circuitry will be turned on, thereby supplying current into one end of the charging path while the Vcc power source supplies current into the other end of the charging path.

The technical advantages of the invention include the following: (1) the response time for the parity circuit is significantly improved because current can be sourced into both ends of the charging path at once; (2) using only two transistors to implement the charging circuitry minimizes the increase in layout area attributable to the addition of the charging circuitry; (3) the concept of the invention is applicable regardless of whether the parity circuit is constructed predominantly with n-channel devices, p-channel devices or other technologies; (4) the charging circuitry of the present invention may be formed in a variety of ways; and (5) the improved parity circuit is readily adaptable for parity generation with any number of input bits.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
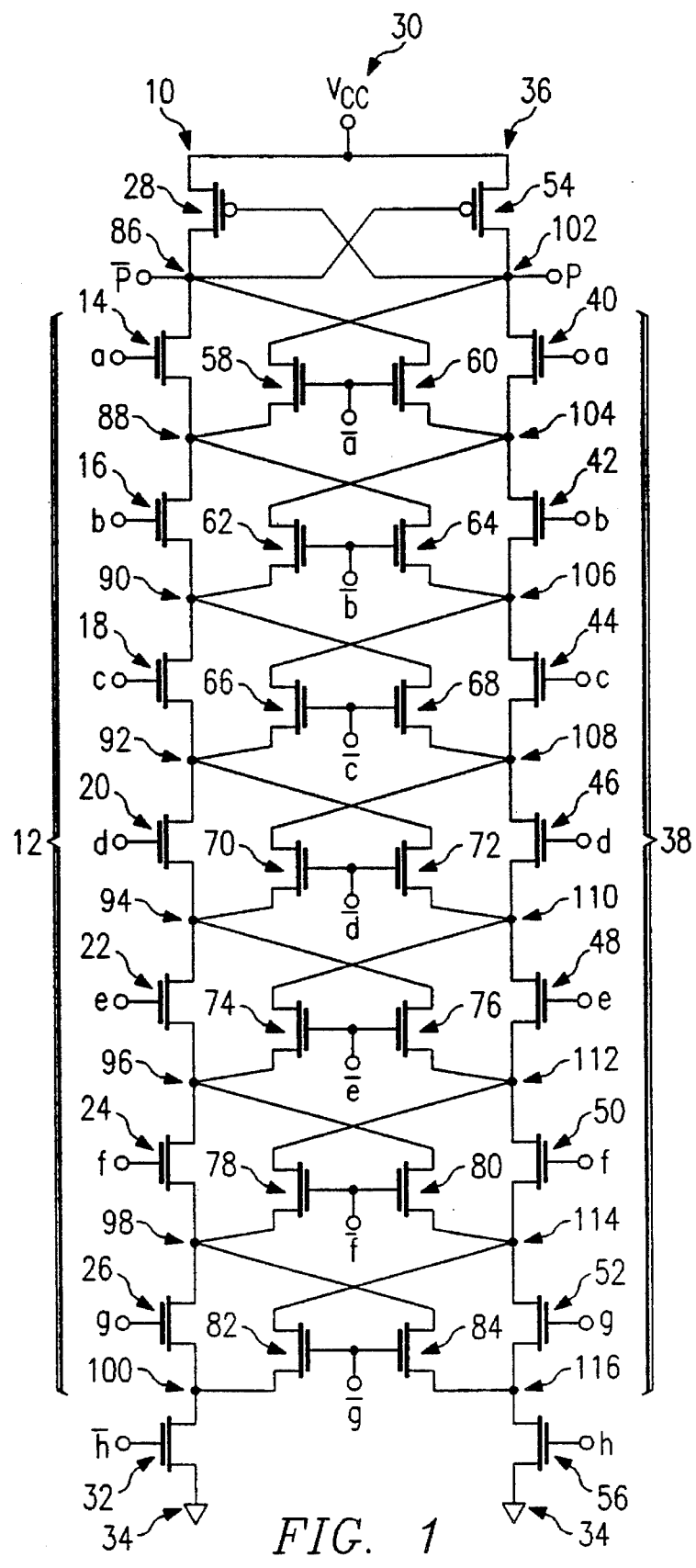
FIG. 1 illustrates, in schematic form, a prior art cross-coupled parity circuit for generating the parity of an eight-bit input data value.
Figure 2:
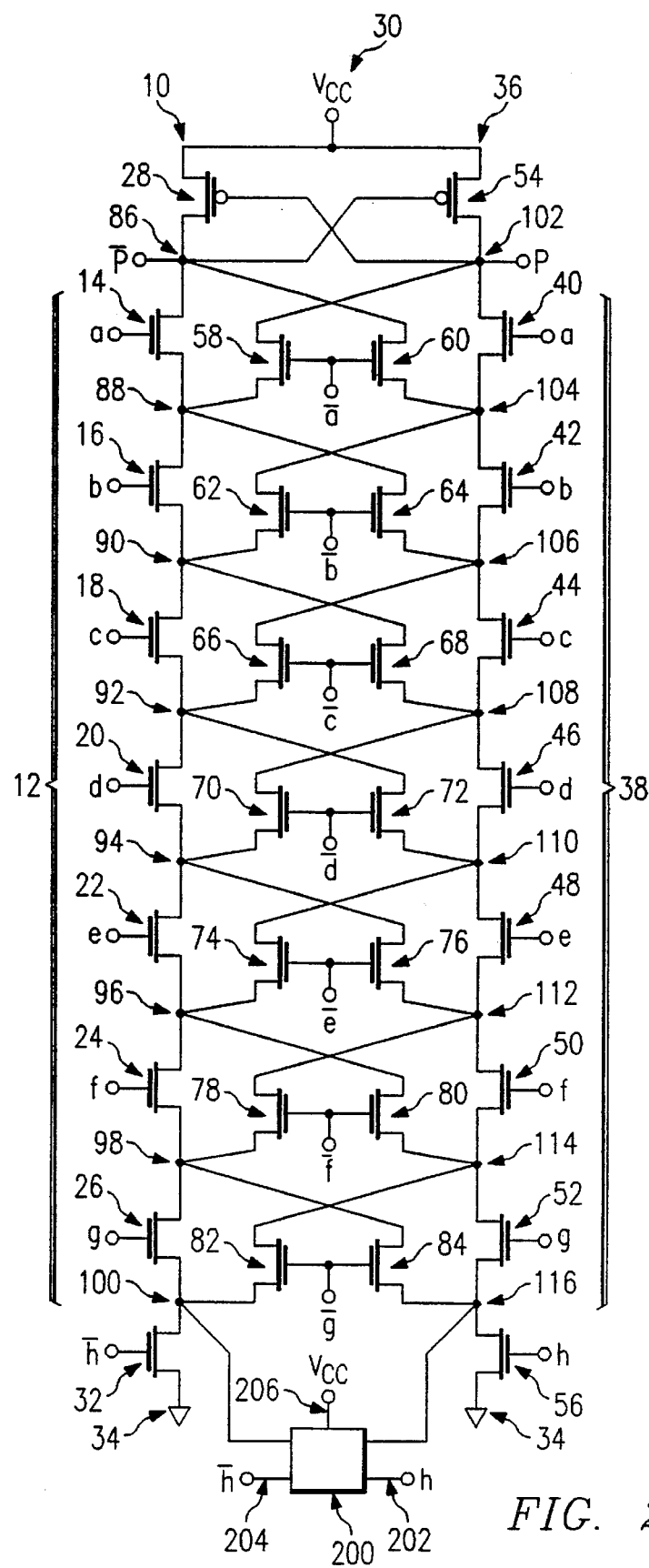
FIG. 2 illustrates the parity circuit of the present invention, showing a charging circuitry in block diagram forms.
Figure 3:
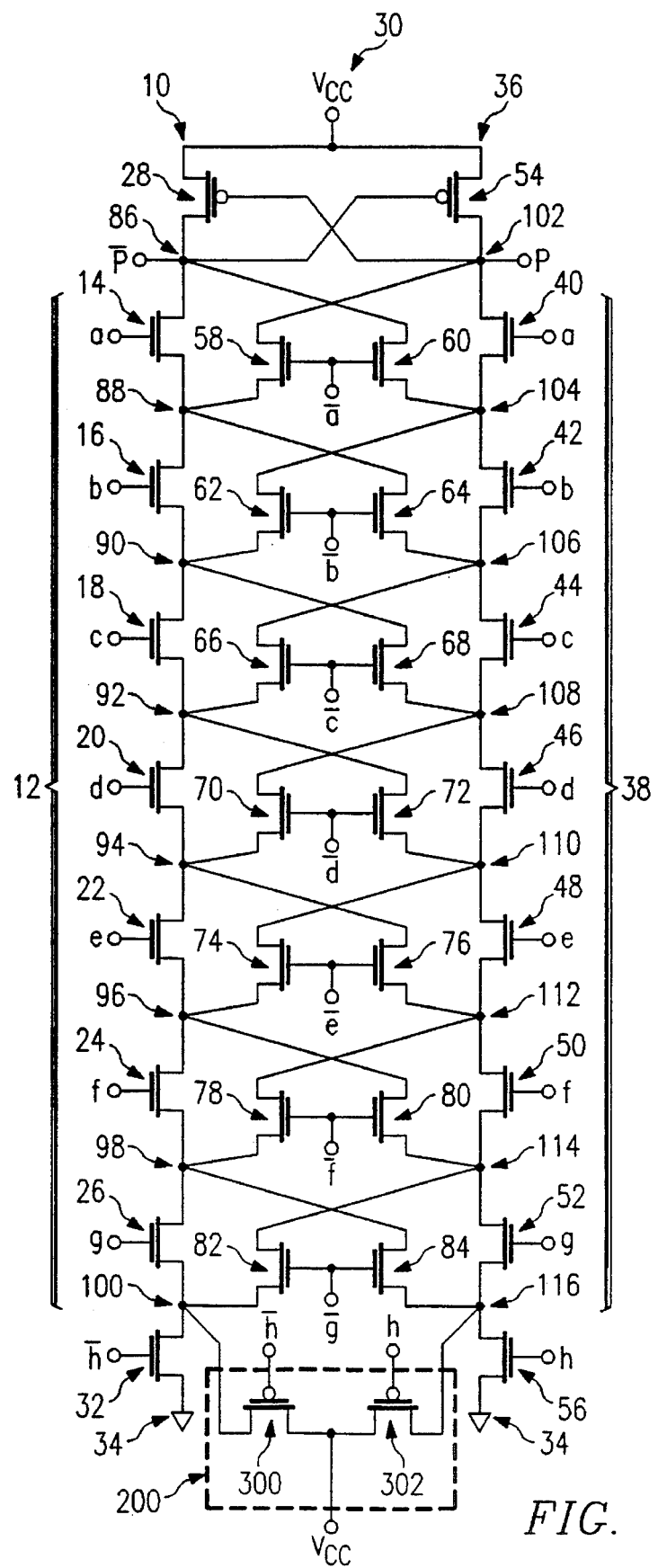
FIG. 3 illustrates the parity circuit of the present invention in schematic form.

The preferred embodiment of the present invention and its advantages are best understood by referring to FIGS. 1–3 of the drawings, like numerals being used for like and corresponding parts of the various drawings.

FIG. 1 illustrates a prior art cross-coupled parity circuit for generating the parity of an eight-bit input data value. The circuit includes a left leg 10, which left leg comprises a chain 12 of series-coupled n-channel field effect transistors 14 through 26, a top-most p-channel transistor 28 for coupling the top of chain 12 to a power source 30, and a bottom-most n-channel transistor 32 for coupling the bottom of chain 12 to a ground 34. The circuit also includes a right leg 36, which right leg comprises a chain 38 of series-coupled n-channel field effect transistors 40 through 52, a top-most p-channel transistor 54 for coupling the top of chain 38 to a power source 30, and a bottom-most n-channel transistor 56 for coupling the bottom of chain 38 to a ground 34. Between left leg 10 and right leg 36 are a group of n-channel cross-coupling transistors 58 through 84, which are capable of coupling left leg nodes 86 through 100 to right leg nodes 102 through 116 as indicated in the drawing.

On the right side of the circuit of FIG. 1, non-inverted input bits a through h are applied to the gates of transistors 40 through 52 and to the gate of transistor 56. On the left side of the circuit, non-inverted input bits a through g are applied to the gates of transistors 14 through 26, while an inverted input bit $\bar{h}$ is applied to the gate of transistor 32. Inverted input bits $\bar{a}$ through $\bar{g}$ are applied to the gates of cross-coupling transistors 58 through 84 as shown. The gate of p-channel transistor 28 is tied to output node 102, and the gate of p-channel transistor 54 is tied to output node 86. Parity output P is taken from output node 102, and parity output $\bar{P}$ is taken from output node 86.

To begin analyzing the operation of the circuit of FIG. 1, assume that input bits a through h are all logical 1's. With these inputs applied to the transistor gates as described, cross-coupling transistors 58 through 84 will all be turned off because their gates are tied to the inverted input bits, which will all be logical 0's. Transistor 56 and transistors 40 through 52 will be turned on, as will be transistors 14 through 26. Transistor 32, however, will be turned off. After the circuit has reached a steady-state condition in which no current flows, output node 102 will be at ground potential, as will be the gate of p-channel transistor 28. P-channel transistor 28 will be turned on, then, because its gate is coupled to ground, and output node 86 will be coupled to Vcc. P-channel transistor 54 will be turned off because its gate will be coupled to Vcc. Therefore, when all input bits are 1, the parity outputs generated by the circuit are P=0 and $\bar{P}$=1.

To use another example, assume that input bit b is a logical 0, and that all other input bits are logical 1's. With these inputs, cross-coupling transistors 62 and 64 will be turned on, while leg transistors 16 and 42 will be turned off. Output node 86 will be tied to ground through transistors 14, 64, 44 through 52, and 56. This will turn on p-channel transistor 54, which will in turn tie output node 102 to Vcc. Thus, with seven input bits equal to logical 1 and one input bit equal to logical 0, the parity bits generated by the circuit are P=1 and $\bar{P}$=0.

Whenever there are an odd number of cross-overs in the D.C. signal path (caused by an odd number of 0's among data bits a through g), parity output P will track the state of input bit h, and parity output $\bar{P}$ will track the state of $\bar{h}$. When there are an even number of cross-overs in the D.C. signal path (caused by an even number of 0's among data bits $\bar{a}$ through $\bar{g}$), parity output P will track the state of $\bar{h}$, while $\bar{P}$ will track the state of h. The result is that when there are an odd number of 0's among the input bits, P=1 and $\bar{P}$=0. When there are an even number of 0's among the input bits, P=0 and $\bar{P}$=1.

The response time for the circuit in FIG. 1 is limited by the fact that outputs P and $\bar{P}$ are not valid until the entire ground path has been brought to ground potential and the entire charging path has been brought to Vcc, thus yielding a steady-state condition. Charging the path that is coupled to Vcc is particularly slow: The devices in the circuit of FIG. 1 that would be farthest away from the Vcc node and closest to the floating end for a given charging path will always charge more slowly than other devices because there are more series devices in their paths, and because the devices in these paths are not fully turned on during the entirety of the charging cycle. This increases overall response time for the circuit of FIG. 1.

Referring now to FIG. 2, the present invention alleviates this problem by adding a charging circuitry 200 to the prior art circuit at nodes 100 and 116. Charging circuitry 200 has two inputs h and $\bar{h}$ connected to terminals 202 and 204 respectively. The charging circuitry 200 is also connected to Vcc (or another power node) at terminal 206. The charging circuitry 200 provides an additional source of current to the charging path thereby reducing its effective resistance. Depending on the state of inputs h and $\bar{h}$ in the circuit of FIG. 2, charging circuitry 200 will couple either node 100 or node 116 directly to Vcc, whereas in the prior art circuit under those same input conditions the subject nodes would have been left floating. (The node that is not connected to Vcc by charging circuitry 200 will be unaffected by charging circuitry 200 so as not to interfere with the ground path of the parity circuit.) The net result is that those devices that would have been farthest from Vcc in the charging path of the prior art circuit will always have, in the circuit of the invention, an additional and shorter path through which to charge. Thus the circuit of the invention, shown in FIG. 2, causes faster charging of the parity circuit, which in turn yields shorter overall response time.

FIG. 3 illustrates the preferred implementation of charging circuitry 200. P-channel transistors 300 and 302 are used to alternately couple nodes 100 and 116 to power supply Vcc depending on the state of inputs h and $\bar{h}$, which inputs are applied to the gates of transistors 302 and 300 respectively. When h=1 and $\bar{h}$=0, transistor 300 is turned on and transistor 302 is turned off. Thus, node 100 will be coupled to $V_{cc}$ under these conditions while node 116 will be unaffected. On the other hand, when h=0 and $\bar{h}$=1, node 116 will be coupled to $V_{cc}$ while node 100 will be unaffected. P-channel transistors are used to implement charging circuitry 200 in the preferred embodiment because they will not cause a significant voltage threshold drop while passing $V_{cc}$. Also, only two such devices are used to minimize the layout area needed to implement the charging circuitry.

The present invention can be used in all types of cross-coupled parity circuits where the necessity of charging limits response time. While the invention has been discussed in connection with a predominantly n-channel parity circuit, the invention is also applicable to cross-coupled parity circuits using any combination of n-channel or p-channel devices or other technologies, and to circuits constructed to generate parity for any number of input data bits. Additionally, while charging circuitry 200 has been discussed in connection with a p-channel transistor implementation, such circuitry may also be implemented using other types and combinations of devices and technologies.

Although a preferred embodiment of the invention has been described in detail herein, it should be understood that various changes, substitutions and alterations can be made therein without departing from the spirit and scope of the invention as defined by the appended claims.

What is claimed is:

1. A cross-coupled parity circuit for checking parity of n-input data bits, comprising:

(a) a first leg having n serially coupled transistors and an output parity bit, the first leg further having a proximal end coupled to a first positive voltage rail and a distal end coupled to a negative voltage rail, each of the transistors of the first leg having a data input coupled to one of the n-input data bits, such transistors being responsive to the n-input data bits to steer current of either the first positive voltage rail or the negative voltage rail to the output parity bit;

(b) a second leg having n serially coupled transistors and an inverted output parity bit, the second leg further having a proximal end coupled to the first positive voltage rail and a distal end coupled to the negative voltage rail, each of the transistors of the second leg having a data input coupled to one of the n-input data bits, such transistors being responsive to the n-input data bits to steer current of either the first positive voltage rail or the negative voltage rail to the inverted output parity bit;

(c) a plurality of cross-coupling transistor pairs, coupled to the first and second legs, each transistor pair having a data input coupled to an inversion of one of the n-input data, the transistor pairs being responsive to the inversion of the n-input data to allow current of either the first positive voltage rail or the negative voltage rail to flow between the first and second legs; and (d) charging circuitry, coupled to (i) a second positive voltage rail, (ii) the first leg at a position between the (n-1)th and nth transistors of the first leg, and (iii) the second leg at a position between the (n-1)th and nth transistors of the second leg, the charging circuitry having a first data input coupled to a nth input data bit and a second data input coupled to an inversion of the nth input data bit, wherein, (e) in a steady state, the transistors of the first and second legs and the plurality of transistor pairs, in response to the n-input data bits, define (i) a negative voltage path extending from the negative voltage rail to either the output parity bit or the inverted output parity bit, and (ii) a charging path extending from the first positive voltage rail to the parity bit not coupled to the negative voltage rail; and (f) the charging circuitry couples the second positive voltage rail to the charging path.

2. The cross-coupled parity circuit of claim 1 wherein the charging circuitry (d) comprises a first and a second p-channel transistor serially coupled between the first and second legs, the first p-channel transistor having a gate receiving the nth input data bit and the second p-channel transistor having a gate receiving an inversion of the nth input data bit.

3. A cross-coupled parity circuit for generating an output parity bit responsive to n-input data bits, comprising:

(a) first leg means having n transistor stages for providing the output parity bit, coupled between a positive voltage rail and a negative voltage rail, the first leg means being responsive to the n-input data bits for steering current of either the positive or negative voltage rail to the output parity bit;

(b) second leg means having n transistor stages for providing an inverted output parity bit, coupled between the positive voltage rail and the negative voltage rail, the second leg means being responsive to the n-input data bits, for steering current of either the positive or negative voltage rail to the inverted output parity bit;

(c) cross-coupling means for coupling current between the first leg means and the second leg means, responsive to an inversion of the n-input data bits; and (d) charging circuitry means, coupled to (i) a second positive voltage rail, (ii) the first leg means at a position between a (n-1)th and a nth transistor stage of the first leg means, and (iii) the second leg at a position between a (n-1)th and a nth transistor stage of the second leg means, being responsive to the nth data input bit and an inversion of the nth data input bit, for coupling the second positive voltage rail to a charging path, such charging path being coupled to the first positive voltage rail and defined by the transistor stages of the first and second leg means and cross-coupling means.

4. A cross-coupled parity circuit for checking parity of n-input data bits, comprising:

(a) a first leg having n serially coupled transistors and an output parity bit, the first leg further having a proximal end coupled to a first positive voltage rail and a distal end coupled to a negative voltage rail, each of the transistors of the first leg having a data input coupled to one of the n-input data bits;

(b) a second leg having n serially coupled transistors and an inverted output parity bit, the second leg further having a proximal end coupled to the first positive voltage rail and a distal end coupled to the negative voltage rail, each of the transistors of the second leg having a data input coupled to one of the n-input data bits;

(c) a plurality of cross-coupling transistor pairs, coupled to the first and second legs, each transistor pair having a data input coupled to an inversion of one of the n-input data; and (d) charging circuitry, coupled to (i) a second positive voltage rail, (ii) the first leg at a position between the (n-1)th and nth transistors of the first leg, and (iii) the second leg at a position between the (n-1)th and nth transistors of the second leg, the charging circuitry having a first data input coupled to a nth input data bit and a second data input coupled to an inversion of the nth input data bit.

5. The cross-coupled parity circuit of claim 4 wherein the charging circuitry (d) comprises a first and a second p-channel transistor serially coupled between the first and second legs, the first p-channel transistor having a gate receiving the nth input data bit and the second p-channel transistor having a gate receiving an inversion of the nth input data bit.

* * * * *